United States Patent [19]

Stefansky

[11] Patent Number: 4,965,684
[45] Date of Patent: Oct. 23, 1990

[54] LOW HEIGHT DISK DRIVE

[75] Inventor: Frederick M. Stefansky, Longmont, Colo.

[73] Assignee: Conner Peripherals, Inc., San Jose, Calif.

[21] Appl. No.: 147,804

[22] Filed: Jan. 25, 1988

[51] Int. Cl.⁵ .................. G11B 5/55; G11B 5/012
[52] U.S. Cl. .................. 360/78.12; 360/75; 360/97.01; 360/105; 369/75.1
[58] Field of Search ........ 360/104, 105, 106, 107–109, 360/86, 97.01–99, 12, 75, 78.04, 77.02; 369/75.1, 75.2, 76–77.2

[56] References Cited

U.S. PATENT DOCUMENTS

| | | | |
|---|---|---|---|
| 4,638,383 | 1/1987 | McGinlay et al. | 360/77.02 |
| 4,639,863 | 1/1987 | Harrison et al. | 360/97.01 |
| 4,654,735 | 3/1987 | Izraelev et al. | 360/105 |
| 4,724,499 | 2/1988 | Bratvold et al. | 360/106 |
| 4,772,974 | 9/1988 | Moon et al. | 360/78.04 |

Primary Examiner—Alan Faber
Assistant Examiner—Steven R. Garland
Attorney, Agent, or Firm—Fliesler, Dubb, Meyer & Lovejoy

[57] ABSTRACT

A low height disk drive having an overall height of one inch (1") or less for a drive having a 3½ inch format. The drive includes a sloped base plate having support surfaces lying in a first plane. A rotatable disk lying in a plane substantially parallel to a first plane and an actuator assembly for positioning a head with respect to the disk are provided on the top of the base plate. A cover is attached to the top of the base plate to maintain the disk and the actuator assembly in a controlled environment. A printed circuit assembly for controlling the disk drive is attached to the bottom of the base plate, and a header passes electrical signals from the printed circuit board to the controlled environment between the base plate and the cover. Within the controlled environment a reverse flex circuit interconnects the header with the actuator assembly and the heads.

26 Claims, 5 Drawing Sheets

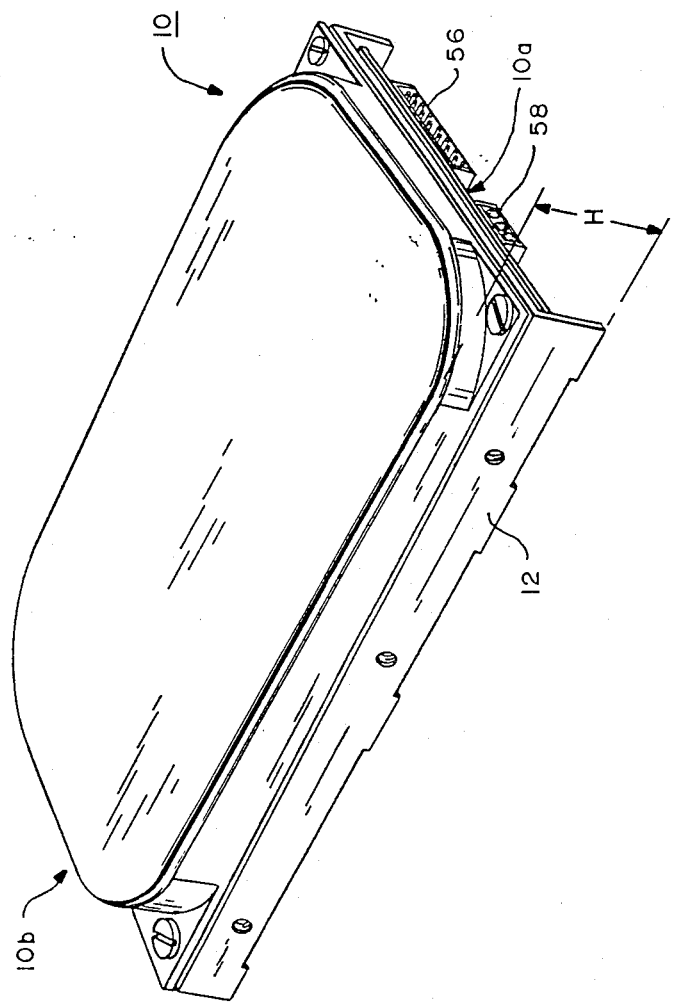
FIG.—1

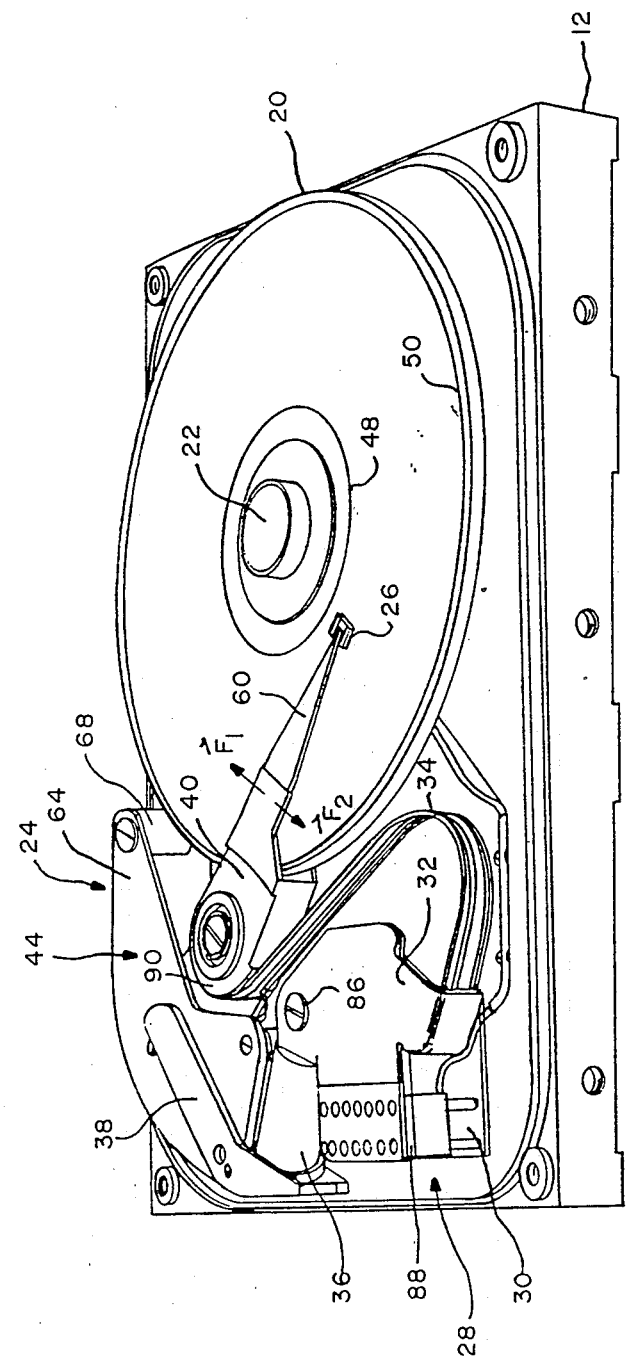
FIG.—2

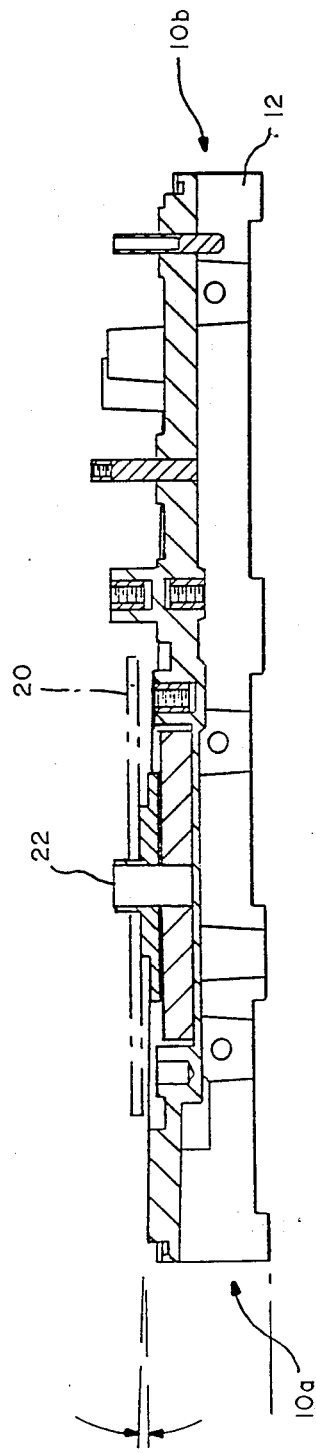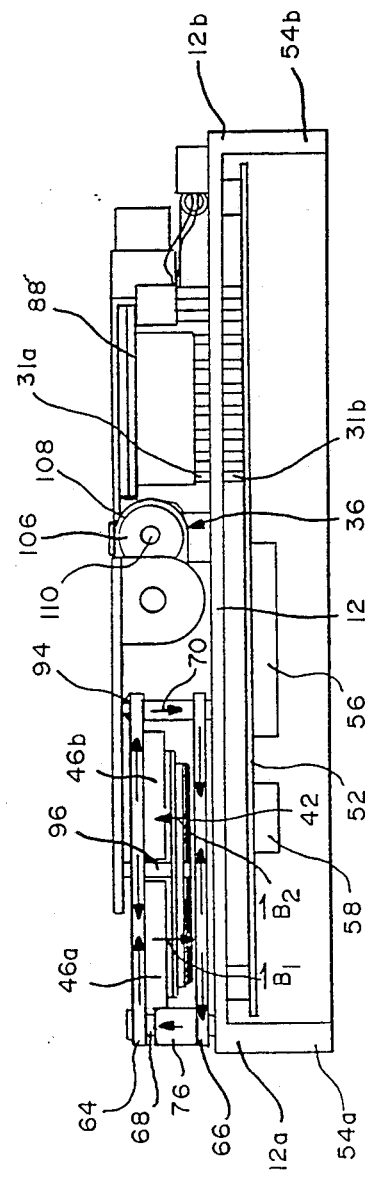

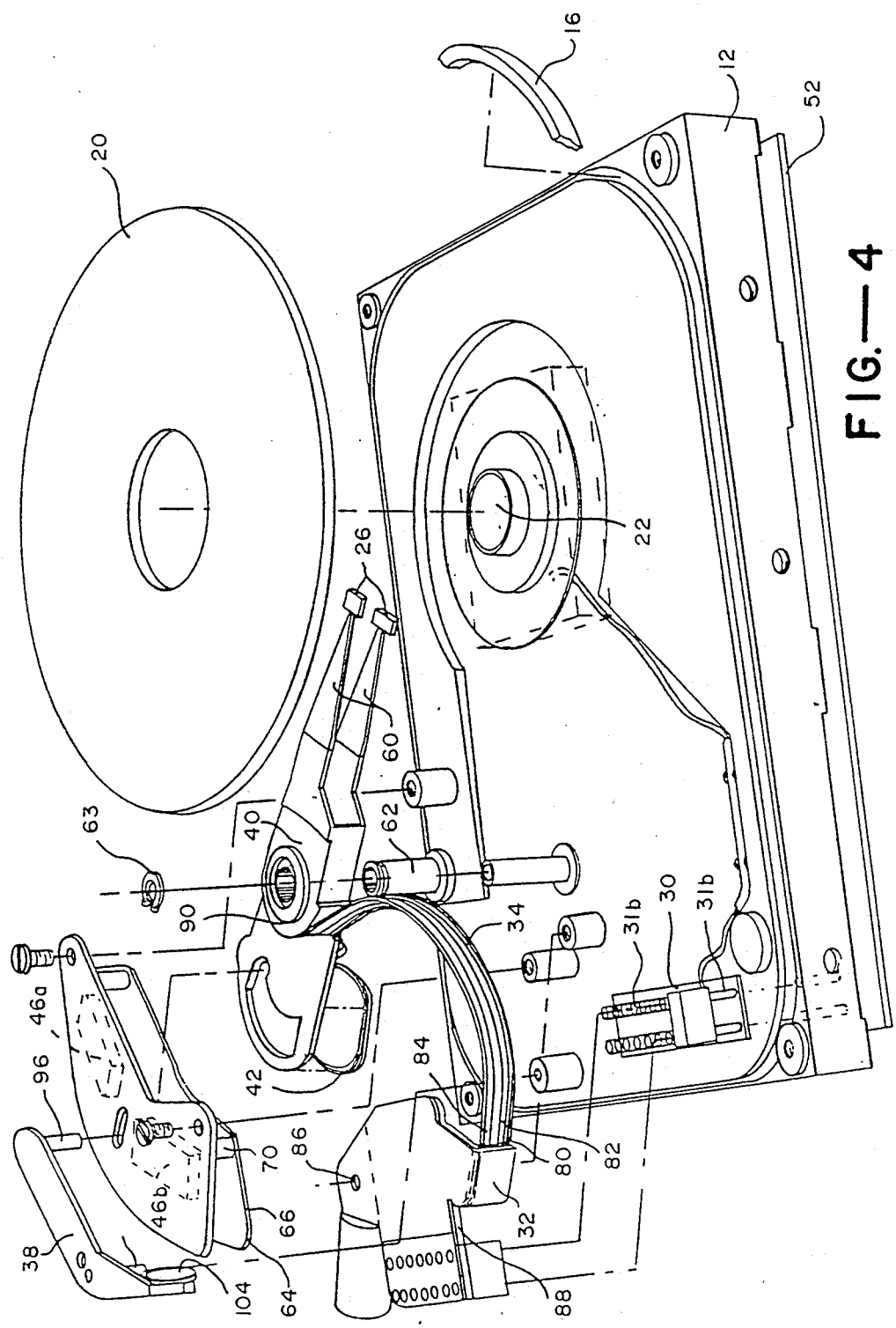
FIG.—4

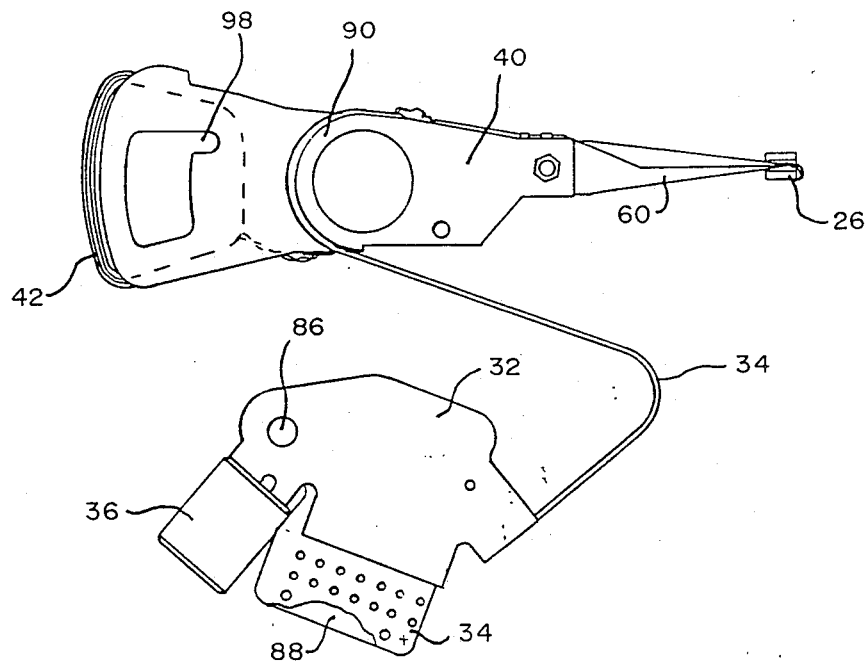
FIG.—6
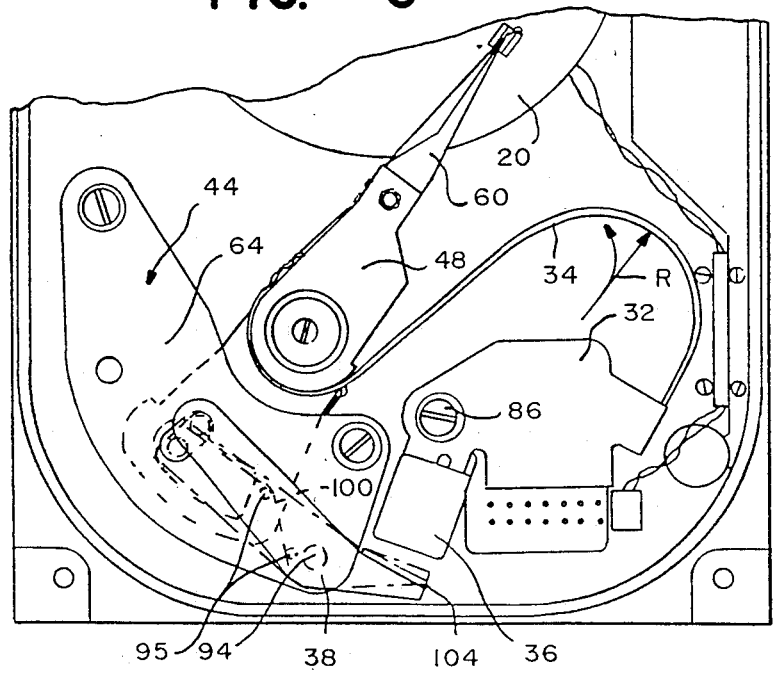
FIG.—7

LOW HEIGHT DISK DRIVE

This is a continuation of application Ser. No. 7/129,879, filed Dec. 4, 1987, now abandoned, which is a continuation of application Ser. No. 6/895,381 filed Aug. 11, 1986, now abandoned.

CROSS-REFERENCE TO RELATED APPLICATIONS (1) DISK DRIVE SYSTEM CONTROLLER ARCHITECTURE, inventors John P. Squires, Tom A. Fiers, and Louis J. Shrinkle, filed June 2, 1987, Application Ser. No. 057,289, assigned to the Assignee of the subject application;

(2) DISK DRIVE SOFTWARE SYSTEM ARCHITECTURE, inventors John P. Squires, Tom A. Fiers, and Louis J. Shrinkle, filed June 2, 1987, Application Ser. No. 057,806, abandoned, assigned to the Assignee of the subject application;

(3) DISK DRIVE SYSTEM ARCHITECTURE UTILIZING IMBEDDED REAL-TIME DIAGNOSTIC MONITOR, inventor John P. Squires, filed June 2, 1987, Application Ser. No. 058,289, abandoned, assigned to the Assignee of the subject application; and (4) LOW-POWER, HARD-DISK DRIVE SYSTEM ARCHITECTURE, filed Feb. 4, 1988, Application Ser. No. 152,069, inventors Louis J. Shrinkle and John P. Squires assigned to the Assignee of the subject Application.

BACKGROUND OF THE INVENTION

1. Field of the Invention.

The present invention relates to disk drives; more particularly, to hard (or fixed) disk drives.

2. Description of the Related Art.

Developments in personal computers, portable computers and lap top computers have prompted reductions in the size and increases in memory capacity of disk drives. Attempts to provide further reductions in the size and weight, and increases in durability and memory capacity of existing disk drives have been met with limited success. The size (particularly the height) and weight of fixed or hard disk drives and the inability of existing hard disk drives to withstand physical shocks and/or vibrations have been factors which have prevented the incorporation of fixed disks in lap-top and in some cases even larger portable computers.

Existing disk drives incorporate a large number of mechanical parts. Each part in a disk drive also represents an increase in the weight of the drive and the space occupied by the drive. A large number of mechanical components makes manufacturing difficult and expensive and increases the possibility and probability of the mechanical failure of the drive. Importantly, the number of mechanical components is related to the ability of the drive to survive physical shocks and vibrations.

Resistance to physical shocks and vibrations is critical to protecting the disk or disks, the head or heads, and the various bearings in a disk drive from damage; in particular, it is necessary to prevent damage to the disks which can cause a loss of data, and damage to the heads or the bearings which can end the life of a drive, resulting in a total loss of data. Prior disk drives, however, have limited resistance to physical shocks. Resistance to physical shocks is of paramount importance in portable computers.

In the operation of conventional drives, mechanical distortion or flexing of the mechanical components of a disk drive which support the heads and disks causes tracking problems by moving the heads, which are mounted at one point on the supporting components, relative to the disk, which is mounted at another point on the supporting components. The heads associated with the top and bottom surfaces of a disk can move relative to the disk to the point where the different heads are in different cylinders—a cylinder being defined as a vertical segment representing the same track on the top and bottom surfaces of a disk. This problem, known as mechanical off-track, is compounded by increased track densities.

Another problem with prior disk drives is the difficulty in sealing the drive to protect the disks from contaminants. This difficulty arises in part, from the large number of points at which access is provided to the environment in which the disk resides. These access points are utilized to bring to the interior of the disk drive electrical circuits which provide current to the motor which rotates the disk, transmit data signals to and from heads which read and record information on the disks, and in some instances, provide current to a voice coil for positioning the head (or heads) with respect to the disk or disks.

Many of these disadvantages of prior disk drives are attributable to the casing—a three-dimensional casting or so-called "toilet bowl"—in which the disks reside. Such a casing is a large, three dimensional piece of cast metal, usually aluminum, having a round portion where the disks reside—hence the name "toilet bowl." A top plate covers the entire open top of the casing, forming a limited seal therewith. The spindle on which the disks rotate is supported by and extends through both the casing and the cover.

The protrusion of the spindle through the casing and the cover provides possible points of entry for contaminants. Further, in disk drives using stepper motors to position the heads with respect to the disk, the stepper motor is located outside of the casing, requiring a seal between the stepper motor and the casing. Acknowledging the existence of points where contaminants can enter the disk drive, manufacturers of conventional disk drives provide a breather filter and design the disk drives so that the rotation of the disks causes the disk drives to exhaust air through leaks in the seals and to intake air only through the breather filter. However, a fairly course filter must be provided in the breather filter for a flow of air to exist, and thus contaminants enter the disk drive through the filter paper.

In conventional disk drives which use a voice coil to pivot an actuator arm in order to position the heads with respect to the disk, a flex circuit, having one end attached to the actuator arm and the other end attached to a fixed point in the disk drive, transfers the information signals to and from the heads. The standard orientation of such a flex circuit is a loop extending away from the disk. The distance between the point at which the flex circuit is attached to the actuator and the end of the disk drive is limited, and thus the radius of the arc or curve of the flex circuit is small and the length of the flex circuit itself is limited. Therefore, the entire flex circuit moves when the actuator arm is pivoted and a torque is exerted on the actuator arm by the flex circuit. The torque exerted on the actuator arm must be compensated for, either added to or subtracted from the torque created by the voice coil, when performing a seek operation. This compensation is complicated by the fact that the torque exerted on the actuator by the flex circuit varies with the position of the actuator.

Various types of locking (or latch) devices have been used to lock the arm of a voice coil in a particular position when the disk drive is not operating. The trend in latch devices is to utilize a high power unit which is separately assembled to provide reliability. However, high power latch devices generate a large amount of heat and use excessive power which is not desirable in a disk drive or any other area in a computer. Further, the operation of conventional latch devices can be position dependent. Thus, the orientation of the disk drive and the computer in which the disk drive is installed could effect the reliability of the latch device. Such a positional dependence of reliability is not satisfactory for portable computers.

SUMMARY OF THE INVENTION

It is, therefore, an object of the present invention to provide a disk drive having a low height, a low weight, and low power consumption.

A further object of the present invention is to provide a disk drive having a small number of mechanical elements with integrated functions.

A further object of the present invention is to provide a disk drive assembly which is highly resistant to damage from physical shocks, and capable of operating in a vibrating environment.

Another object of the present invention is to provide a disk drive which is easy to assemble.

Another object of the present invention is to provide a disk drive in which any mechanical off tracking of the heads is mechanically minimized and electronically corrected.

Another object of the present invention is to reduce the torque exerted on the actuator by the flex circuit.

Another object of the present invention is to provide a disk drive assembly in which a single electrical connector transfers all electrical currents and data signals from the environment in which the disks reside to the exterior of the environment, and in which a header which communicates those electrical signals through the base plate is the only communication between the interior and exterior of the drive.

The present invention is directed to a low height, low power, low weight disk drive, comprising a base plate lying in a first plane, storage means (a disk) rotatably supported on the top of the base plate and lying in a second plane making an angle with the first plane, interactive means (or heads) for reading information from and writing information on the storage means, actuator means supported at a first end of the top of the base plate for selectively positioning the interactive means with respect to the storage means in response to control signals, control means supported from the bottom of the base plate for generating control signals and for providing information signals to and receiving information signals from the interactive means, connection means supported at a first end of the base plate for interconnecting the control means with an external processing unit, and a cover attached and sealed to the top of the base plate to provide a controlled environment between the cover and the base plate. A header provides electrical interconnections between the control means and the controlled environment between the cover and the base plate, and inside the controlled environment a reverse flex circuit electrically interconnects the header with the interactive means and the actuator means. The reverse flex circuit is arranged so that it exerts a minimum torque on the actuator means.

A specific advantage of the present invention is that the disk drive has a reduced height with respect to conventional disk drives utilizing disks of approximately the same diameter. In particular, a three and one-half inch (3.5") single platter drive of the present invention has an overall height of one inch (1"). Furthermore, the disk drive of the present invention is light in weight—a 3.5 inch single platter drive of the present invention weighs slightly more than one pound. The reduced height is achieved by providing the base plate with a sloped profile which accommodates the external connectors (connection means) at the second end of the drive and the internal components (for example, the actuator means) at the first end.

Another advantage of the disk drive of the present invention is that a minimum number of components having integrated functions are utilized which makes the drive easy to assemble and loW in weight.

A further advantage of the present invention is that the reverse flex circuit allows the actuator means to move with a minimum restriction, thus decreasing access times and increasing seek accuracy.

A further advantage of the present invention is that a single electrical connector (header) transfers all electrical signals between the exterior and the interior of the casing, thereby reducing the possibility of the introduction of contaminants to the controlled environment within the casing. Importantly, the disk drive of the present invention does not require a breather filter.

A further advantage of the present invention is that the disk drive assembly is resistant to damages caused by physical shock and vibration.

A further advantage of the present invention is that the small number of mechanical parts reduces the possibility of breakdowns due to mechanical failures.

BRIEF DESCRIPTION OF THE DRAWINGS

FIGS 1-7 illustrate the disk drive of the present invention. In particular:

FIG. 1 is an isometric vieW of a disk drive according to, the present invention;

FIG. 2 is an isometric view of the disk drive of the present invention with the cover removed;

FIG. 3 is a cross-sectional view of the disk drive of the present invention along line 3—3' of FIG. 2;

FIG. 4 is an exploded view of the disk drive of the present invention;

FIG. 5 is an end view of the disk drive of the present invention;

FIG. 6 illustrates the actuator assembly; and

FIG. 7 illustrates the latch mechanism.

DESCRIPTION OF THE PREFERRED EMBODIMENT

A disk drive according to the present invention will be described with reference to FIGS. 1-7. The disk drive described herein includes, for example, a single hard disk with a magnetic coating and utilizes Winchester technology; however, the disk drive of the present invention may utilize various numbers of disks and other types of disks, for example, optical disks, and other read/write technologies, for example lasers. The diameter of the disks utilized in the disk drive of the present invention have a diameter on the order of 3.75 inches, or so-called "3.5 inch" disks; the disk drive of the present invention can be implemented with disks of other diameters whether larger or smaller than 3.75 inches.

FIG. 1 shows the disk drive of the present invention as assembled. Although not to scale, FIG. 1 illustrates the relationship between the length, width, and height of the disk drive, and thus low profile of the disk drive. In particular, the height "H" of the disk drive of the present invention is one inch (1").

One feature of the disk drive of the present invention which provides the low height of the drive is the sloped profile of base plate 12 and cover 14. The sloped profile provides extra vertical space below base plate 12 at the first end 10a of the disk drive and provides extra vertical space between base plate 12 and cover 14 at the second end 10b of the disk drive 10. If the sloped profile were not provided, the amount of space allocated above and below base plate 12 would be the maximum amount of space provided at the respective first and second ends 10a, 10b of the disk drive 10; accordingly, the overall height of the disk drive would be increased.

The disk drive of the present invention has the following outline dimensions: Height 1.0" (2.54 cm); Length 5.75" (14.61 cm); and width 4.0" (10.61 cm), and a total weight slightly over one (1) pound. Importantly, the disk drive of the present invention weighs approximately ½ of the weight of standard 3.5" disk drives of 20 Mb capacity. Even greater proportional reductions are provided when the disk drive of the present invention is formatted for 40 Mb capacity without any change in size or weight.

The cover 14 is attached to base plate 12 to provide a controlled environment between base plate 12 and cover 14. A gasket 16 (FIG. 4) between base plate 12 and cover 14 provides the seal. The ability to provide a controlled environment alleviates the need for a breather filter and allows the disk drive of the present invention to use an internal air filtration system (not shown). The seal provided by gasket 16 is stable, during operation of the disk drive, at pressures experienced at altitudes from 200 feet below sea level to 10,000 feet above sea level.

As shown in FIG. 2 the internal components of the disk drive are separated into three interrelated groups: disk 20 and spin motor 22; actuator assembly 24 for positioning heads 26 with respect to disk 20; and header assembly 28, including header 30, bracket 32, reverse flex circuit 34 and coil 36 for pivoting latch arm 38.

Actuator assembly 24 includes pivotable actuator arm 40, heads 26 (FIG. 4) mounted at a first end of actuator arm 40, an actuator coil 42 mounted at a second end of actuator arm 40 on the opposite side of the pivot point from the first end of the actuator arm, and a magnet structure 44. Magnet structure 44 supports magnets 46 (FIG. 4) and its components, as described in detail below, are formed of magnetically permeable material to provide returns for the magnetic fields generated by magnets 46. The magnet structure 44 and actuator coil 42 are arranged so that a current in coil 42 passes through the magnetic fields created by magnets 46 to create a force which pivots actuator arm 40. Currents passing in opposite directions of coil 42 create torques in opposite directions and pivot actuator arm 40 to position heads 26 at all locations between and including inside and outside diameters 48 and 50 of disk 20.

In a conventional disk drive utilizing a voice coil, a flex circuit is provided in the region between header 30 and actuator arm 40. Reverse flex circuit 34 curves toward the disk, thereby allowing latch coil 36 to be placed between header 30 and actuator arm 40.

A printed circuit assembly (or control means) 52 is attached to the bottom of base plate 12. Header 30 carries all of the electrical signals from the printed circuit assembly 52 to the controlled environment between base plate 12 and cover 14. Header 30 has a minimum number of pins due to the fact that a DC motor requiring only three (3) leads is utilized. Such a motor is described in U.S. patent application Ser. No. 880,754, abandoned, entitled METHOD AND APPARATUS FOR BRUSHLESS DC MOTOR SPEED CONTROL, filed July 1, 1986, inventors John P. Squires and Louis J. Shrinkle, assigned to the Assignee of the subject application.

The structure of the disk drive 10 of the present invention which provides the disk drive with a low overall height will be described with reference to FIG. 3, which is a cross-sectional view along line 3—3' in FIG. 2, and FIG. 5. As show in FIG. 5, base plate 12 includes two rails 54a and 54b at first and second sides 12a and 12b of base plate 12. Rails 54a and 54b are constructed so that the mounting surface 12c of the base plate 12 sits at an angle with respect to the plane of the surface on which rails 54a and 54b rest. This angled relationship of base plate 12 and the support surface 12c provides more room below base plate 12 at the first end 10a of the disk drive than at the second end 10b of the disk drive. Only a small amount of space is necessary for printed circuit assembly 52, including the components mounted thereon; however, it is necessary to provide a connector 56 and a power plug 58 on printed circuit assembly at the first end 10a of the disk drive, both of which require more space than the printed circuit assembly 52. The slope of base plate 12 provides the necessary vertical space for connector 56 and power plug 58 beneath the base plate 12 at the first end 10a of the disk drive. Connector 56 provides an interface between the printed circuit assembly 52 and a host computer (not shown), and power plug 58 provides an interface between printed circuit assembly 52 and an external power source (not shown).

Conversely, disk 20 is the only component located above the base plate 12 at the first end 10a of the disk drive whereas the actuator assembly 24 is located above the base plate 12 at the second end 10b of the disk drive. Actuator assembly 24 requires more vertical space than disk 20 and the slope of base plate 12 provides more space above the base plate at the second end 10b of the disk drive 10 than above the base plate 12 at the first end 10a of the disk drive in order to accommodate the actuator assembly 24. As shown in FIG. 1 the portion of cover 14 which meets with base plate 12 has an angle which corresponds to the angle of the base plate, and thus the top of the cover 14 is parallel with the support surface. Therefore, even though the base plate is sloped, the profile of the disk drive 10 is a rectangle as opposed to a parallelogram.

Disk 20 lies in a plane which is parallel to the support surface and which forms an angle with the plane of base plate 12. All of the support points on base plate 12 are designed so that the internal components (e.g., actuator assembly 24) lie in the same plane as disk 20 and the support surface.

The structure and operation of actuator assembly 24 will be explained with reference to FIGS. 4–7. The function of the actuator assembly 24 is to position heads 26 with respect to the surfaces of disks 20 by pivoting actuator arm assembly 40; more specifically, to position the heads 26 over individual tracks on disk 20. Heads 26 are supported on actuator arm 40 by flexures 60. A bearing cartridge 62, which is fixed to the base plate 12, is inserted in actuator arm 40 to provide a pivot point. Actuator arm 40 is attached to bearing cartridge 62 by a clip ring 63, which allows the bearing cartridge 62 to be removable so that the actuator arm 40 may be cleaned independently of the bearing cartridge 62. Actuator coil 42 is provided on actuator arm 40 on the opposite side of the pivot point from heads 26. Actuator arm 40, including all of the components attached thereto, is precisely balanced, i.e., equal amounts of weight are provided on either side of the pivot point so that the positioning of heads 26 is less susceptible to shock and can function in any axis satisfactorily.

The force utilized to pivot arm assembly 40 is provided by a voice coil assembly, including actuator coil 42 and magnet structure 44. Magnet structure 44 comprises top and bottom plates 64, 66 formed of magnetically permeable material, support posts 68, 70 also formed of magnetically permeable material, and first and second magnets 46a, b attached to the top plate 64. Top and bottom plates 64. 66 in conjunction with support posts 68, 70 function as returns for the magnetic fields provided by first and second magnets 46a, b. It is important that there are no air gaps between support posts 68, 70 and either the top or bottom plate 64, 66; any air gap would create a reluctance in the return, reducing the strength of the magnetic field.

First and second magnets 46a, b have opposite poles attached to top plate 64 (e.g., the south pole of first magnet 46a and the north pole of second magnet 46b are attached to top 64) to provide first and second magnetic fields $\vec{B}_1$, $\vec{B}_2$ between respective ones of the first and second magnets 46a, b and bottom plate 66. First and second magnetic fields $\vec{B}_1$, $\vec{B}_2$, are encompassed in three closed magnetic field loops. The first closed magnetic field loop extends between the first magnet 46a and bottom plate 66 and passes through a return provided by bottom plate 66, first support 68, and top plate 64. The second closed magnetic loop passes from first magnet 46a to bottom plate 66, through bottom plate 66 and between bottom plate 66 and second magnet 46b, and from second magnet 46b to first magnet 46a via top plate 64. The third closed magnetic loop extends between bottom plate 66 and second magnet 46b and passes through a return provided by top plate 64, second support 70, and bottom plate 66. By containing the magnetic fields $\vec{B}_1$ and $\vec{B}_2$, in returns, the magnetic field intensity of each field is increased in the region between the respective first and second magnets 46a, b and bottom plate 66; the strength of the magnetic field in this region is directly related to the torque which the voice coil exerts on the actuator arm 40, and thus the rotational velocity of actuator 40 and the seek times for the drive.

Actuator coil 42 is positioned so that it carries a current in opposite directions in first and second magnetic fields $\vec{B}_1$ and $\vec{B}_2$.

The force on a current carrying wire in a magnetic field is proportional to the magnetic field intensity, and is expressed by the equation $\vec{F} = id\vec{l} \times \vec{B}$, where $\vec{F}$ is the force, i is the current, $\vec{l}$ is the length of the wire, and $\vec{B}$ is the magnetic field. Passing a current in opposite directions in actuator coil 42 provides respective forces $\vec{F}_1$ and $\vec{F}_2$ (FIG. 2); these forces $\vec{F}_1$ and $\vec{F}_2$ pivot actuator arm 40 in opposite directions.

Crash stops are provided to limit the pivoting movement of actuator arm 40 so that heads 26 travel only between selected inside and outside diameters 48, 50 of disk 20. An outside diameter crash stop is provided by a sleeve 76 (FIG. 5) fitted on support post 68. When the pivoting motion of actuator arm 40 places heads 26 at the outside diameter 50 of disk 20 a portion of the actuator arm 40 contacts outside diameter crash stop 76, thereby preventing further movement of the heads 26. An inside diameter crash stop is provided by a portion of the latch mechanism (FIG. 7) and is described below.

Reverse flex circuit 34 for carrying electrical signals from header 30 to heads 26 and actuator assembly 24 will be described with reference to FIGS. 2, 4, 6 and 7. The reverse flex circuit is separated into three portions. A first portion 80 carries current to actuator coil 42. A second portion 82 is a ground plane which separates the current carrying portion 80 from a third data carrying portion 84. The data carrying portion 84 provides signals to heads 26 for recording information on disk 20 and carries signals from the heads 26 to the printed circuit assembly 52, via header 30, when reading data from disk 20. Interference with the relatively weak data signals which would otherwise be caused by the larger currents necessary for actuator coil 42 passing through the first portion 80 of the reverse flex circuit 34 is prevented by the provision of ground plane 82.

The reverse flex circuit 34 is electrically connected to pins 31a of header 30; however, pins 31a also serve to position the reverse flex circuit 34. In particular, bracket 32 supports reverse flex circuit 34 and latch coil 36. Bracket 32 is attached to base plate 12 by a single attachment point 86 and is rotationally positioned by the engagement of reverse flex circuit 34 and pins 31a—the positioning of latch coil 36 being important to the operation of the latch mechanism as described below. A stiffener 88 is attached to reverse flex circuit 34 in the areas where it engages pins 31a and is attached to bracket 32 to provide the rigidity necessary to rotationally position bracket 32, and to facilitate engagement of reverse flex circuit 34 and pins 31a. Reverse flex circuit 34 is parallel to the plane of base plane 12 in the region of header 31 but passes through a bend of approximately 90 degrees so that it forms the loop which extends towards disk 20 and connects header 30 to actuator assembly 24.

First portion 80 of reverse flex circuit 34 terminates at the point where reverse flex circuit 34 joins actuator arm 40; however, the second and third portions 82 and 84 wrap around a shoulder 90 of actuator arm 40 which surrounds bearing cartridge 62. Wrapping the second and third portions 82 and 84 of reverse flex circuit 34 around shoulder 90 provides access to current-carrying wires are provided on the side of the flex circuit which faces the base plate in the region where reverse flex circuit 34 engages pins 31a of header 30, and thus on the inside of the curved portion of reverse flex circuit 34 extending from bracket 32 to actuator arm 40. As the first and second portions 82 and 84 wrap around shoulder 90, the side of reverse flex circuit 34 on which the current-carrying wires are provided is exposed at the end of reverse flex circuit 34, facilitating the attachment of wires 91 which connect heads 26 to reverse flex circuit 34. If wires 91 were to be connected to reverse flex circuit 34 at the point where reverse flex circuit 34 first contacts actuator arm 40, it would be necessary to wrap wires 91 around reverse flex circuit 34 or to provide connections through the reverse flex circuit 34—both being more complex and less desireable manners of providing electrical connections between wires 91 and reverse flex circuit 34.

Any torque exerted on actuator arm 40 by means other than the voice coil assembly affects the function of actuator assembly 24 in positioning heads 26 with respect to disk 20, particularly the track-following and seek functions described in the above-referenced applications entitled DISK DRIVE SOFTWARE SYSTEM ARCHITECTURE and DISK DRIVE SOFTWARE SYSTEM ARCHITECTURE UTILIZING IMBEDDED REAL TIME DIAGNOSTIC MONITOR. The force provided by the voice coil assembly must be controlled to compensate for the force exerted by the reverse flex circuit 34. Accordingly, the radius R (FIG. 7) of the curve in reverse flex circuit 34 is made as large as possible to minimize the torque exerted on actuator arm 40 by reverse flex circuit 34. The radius of the curve in reverse flex circuit 34 is approximately twice as large as the radius in the curve of a conventional flex circuit. In addition, the reverse flex circuit 34 moves in an essentially linear manner when actuator arm 40 rotates, whereas a conventional reverse flex circuit must bend throughout its curve. Accordingly, the torque exerted on actuator arm 40 by reverse flex circuit is greatly reduced with respect to the torque exerted by a conventional flex circuit.

Another advantage provided by reverse flex circuit 34 is the ability to place latch coil 36 in a position in the base plate 12 where a conventional flex circuit would be located, and thus to integrate latch coil 36 with reverse flex circuit 34 and bracket 32. Separate wires from header 30 to latch coil 36 are, therefore, not necessary. Further, installing this integrated group of components requires fewer steps than installing individual components. In addition, the critical positioning of latch coil 36 is provided by reverse flex circuit 34 and stiffener 88 which controls the pivotal positioning of bracket 32, as described above.

All connections between the sealed environment between base plate 12 and cover 14 and printed circuit assembly 52 are provided by header 30. Pins 31a, which engage reverse flex circuit 34, also engage motor wire connector 92. Pins 31b extend below base plate 12 and engage a rear entry connector (not shown) on printed circuit assembly 52. A rear entry connector is utilized because the integrated and discrete circuit components and the surface wirings are on the side of printed circuit assembly 52 facing away from base plate 12.

A latch mechanism for locking the actuator arm 40 in an orientation where heads 26 are positioned at the inside diameter 48 of disk 20, will be described with reference to FIGS. 4, 5 and 7. During power-down of the disk drive 10 control means 52 causes actuator assembly 24 to pivot the actuator arm 40 to the position where the heads 26 are at the inside diameter of the disk over a nondata area of disk 20 before the rotational speed of the disk 20 is decreased to the point where the heads 26 land on the disk 20. Thus, the heads 26 land only on the nondata area at the inside diameter of the disk 20.

The electromagnetic latch includes latch coil 36, a latch arm 38 which pivots on pivot 94 and has a finger 96 for engaging latch notch 98 in actuator arm 40, and a spring 100 for biasing the latch arm 38 to the locked position.

An electromagnet, including latch coil 36 and swivel plate 104, is used to pivot latch arm 38 to the unlocked position against the force of spring 100. Latch coil 36 includes a capture plate 106 having an outer wall 108 and a center pole 110. The outer wall 108 and center pole 110 form opposite poles of an electromagnet, and when a current is passed through a coil (not shown) the magnetic field of capture plate 106 attracts swivel plate 104; swivel plate 104 is mounted on the latch arm 38 so that it can swivel in all directions and be flush with and contact the entire outer wall 108 when the swivel plate 104 is captured by the electromagnet. Contact between the entire outer wall 108 and swivel plate 104 is necessary to provide reliability in the capture and retention of the swivel plate 104. Swivel plate 104 is stepped so that it does not contact center pole 110; a small gap (0.005) between swivel plate 104 and center pole 110 causes the latch coil 36 to release the swivel plate 104 when the current in the coil (not shown) is discontinued. A high DC voltage is applied to the latch coil 36 for a short time to capture the swivel plate 104. Then, the applied voltage is reduced to a small capture maintenance level. Thus, this structure is low in power consumption and heat dissipation. Further, despite the low power consumption of the latch coil 36 it is highly reliable in its capture, holding, and release of swivel plate 104.

Spring 100 is a linear spring engaging finger 96 in a loaded state, spring 100 being maintained in the loaded state by spring supports 95. The moving end of the spring is very close to the fulcrum of the latch, thereby providing a constant spring force.

Finger 96 also serves as the inside diameter crash stop. Finger 96 is well suited for the inside diameter crash stop because it is positioned to engage notch 98 which is at one edge of opening 102 in actuator arm 40. The abutment of finger 96 and the same edge of opening 102 when the latch is unlatched provides the inside diameter crash stop. However, the pivoting movement of latch arm 38 in moving to the latched position reduces the distance between pivot 94 and the edge of opening 102. Therefore, the actuator arm 40 pivots slightly to move the heads further away from the data zone.

The above-described structure of the disk drive of the present invention provides excellent protection from shock and vibration. In particular, the disk drive will withstand nonoperating shocks of 100g's and operating shocks, without nonrecoverable errors, of 0.5g's. Nonoperating vibration of 4g's in the range of 5–500 Hz is the specified tolerable limit. Operating vibration, without nonrecoverable data, is specified at 0.5g's for the range of 5–500 Hz.

The disk 20 has 752 tracks per surface due to the ability of the actuator assembly 24 to operate with a track density of 1150 tracks per inch. Thus, utilizing 26 blocks per track and 512 bytes per block, the disk drive of the first embodiment has a formatted capacity of 20 MBytes. The actuator assembly 24 provides an average seek time of 28 ms and a track-to-track seek time of 7 ms. The average seek time is determined by dividing the total time required to seek between all possible ordered pairs of track addresses by the total number of ordered pairs addressed.

The assembly of the disk drive 10 of the present invention requires less steps than assembly of conventional disk drives. The spin motor 22 and disk 20 are attached to base plate 12. Then, an integrated actuator group, including actuator arm 40, bracket 32, reverse flex circuit 34, and latch coil 36, all previously assembled, is installed. Magnet structure 44 is then placed on one of its attachment points and pivoted into position so that the portion of actuator arm 40 holding actuator coil 42 extends between the top and bottom plates 64, 66 of the magnet structure 44. Latch arm 36 is then placed on its pivot point. The disk 20 is then pack written, and thereafter cover 14 is attached. Finally, printed circuit assembly 52 is attached outside of the clean room.

Those skilled in the art will appreciate that the structure of the disk drive of the present invention as described herein can be sealed for use with disk drives having disks with smaller and larger than 3.5 in.

The many features and advantages of the disk drive of the present invention will be apparent to those skilled in the art from the Description of the Preferred Embodiments. Thus, the following claims are intended to cover all modifications and equivalents falling within the scope of the invention.

What is claimed is:

1. A disk drive including a base plate, a rotatable storage medium, interactive means for reading and writing information on said storage medium, electrical interface means for making electrical interconnections between said interactive means and control means, and a cover sealably attached to said base plate to provide a controlled environment for said storage medium and said interactive means, characterized in that:
    said disk drive lies in a first plane;
    said base plate lies in a second plane, said second plane making an angle greater than zero degrees with said first plane; and
    said base plate has first and second ends, a top, and a bottom, and said interactive means is provided on said top and at said first end of said base plate and said electrical interface means is provided on said bottom and at said second end of said base plate to reduce the dimensions of the disk drive in the direction normal to said first plane.

2. A disk drive according to claim 1, further characterized in that said storage medium lies in a plane substantially parallel with the first plane.

3. A low height disk drive, comprising:
    a base plate lying in a first plane and having a top, a bottom, first and second ends, and support rails for supporting said disk drive in a second plane making an angle greater than zero degrees with said first plane;
    storage means rotatably supported on said top of said base plate, said storage means lying in a third plane substantially parallel to said second plane;
    interactive means for reading information from and writing information on said storage means;
    actuator means supported at said first end of said top of said base plate for selectively positioning said interactive means with respect to said storage means in response to control signals;
    control means supported on said bottom of said base plate for generating control signals, and for providing information signals to and receiving information signals from said interactive means;
    connection means supported at said second end of said bottom of said base plate for interconnecting said control means with an external processing unit; and
    a cover sealably attached to said top of said base plate to provide a controlled environment between said cover and said base plate.

4. A disk drive according to claim 3, wherein:
    said actuator means positions said interactive means at points in a plane substantially parallel to said second plane and comprises:
        an actuator arm pivotably attached to said base plate, said actuator arm having a first end for supporting said interactive means and a second end,
        magnetic means, supported by said base plate, for providing a magnetic field, and
        a coil attached to said second end of the actuator arm for passing an electric current in said magnetic field; and
    said control means provides the current to said coil.

5. A disk drive according to claim 3, wherein:
    said first and second planes intersect at a line which is substantially parallel to said first and second ends of said base plate; and
    said actuator means positions said interactive means at points in a plane substantially parallel with said second plane.

6. A low height disk drive according to claim 5, wherein: said actuator means comprises an actuator arm pivotably attached to said base plate, said actuator arm having a first end for supporting said interactive means and a second end, magnetic means supported by said base plate for providing a magnetic field, and a coil attached to the second end of the actuator arm for passing an electric current in the magnetic field;
    said actuator arm has a curved shoulder portion surrounding a portion of the pivot point;
    a reverse flex circuit which has a first portion for electrically interconnecting a header and said interactive means and which wraps around said shoulder portion of said actuator arm and a second portion for electrically interconnecting said header and said coil.

7. A low height disk drive according to claim 6, wherein said reverse flex circuit further comprises a ground plane separating said first and second portions of the said reverse flex circuit.

8. A low height disk drive according to claim 3, further comprising:
    means for electrically interconnecting said control means, said interactive means and said actuator means, comprising:
        a header, provided at the first end of said base plate, for providing electrical interconnections between said control means and the controlled environment between said cover and said base plate, and
        a reverse flex circuit having a first end attached to said header and a second end attached to said actuator means, the portion of said reverse flex circuit between said first and second ends forming a curve which opens away from said storage means;
    latch means for selectively engaging said actuator means;
    a bracket assembly supported by said base plate and engaged with a portion of said reverse flex circuit; and
    latch control means supported by said bracket assembly, for engaging and disengaging said latch means with said actuator means.

9. A low height disk drive according to claim 6, wherein:
said header includes connecting pins extending into the controlled environment between said cover and said base plate;
said reverse flex circuit engages said connecting pins;
said reverse flex circuit further comprises a stiffener attached to the portions of the reverse flex circuit engaging said connecting pins and said bracket assembly, so that the engagement of said reverse flex circuit and said connecting pins positions said bracket assembly and said latch control means.

10. A low height disk drive responsive to a host computer, comprising:
a base plate;
a disk rotatably mounted on said base plate;
interactive means for reading information from and writing information on said disk;
an actuator arm pivotably supported on said base plate, said actuator arm having a first end for supporting said interactive means and a second end disposed on the opposite side of said pivotable support from said first end, said second end of said actuator arm having a latch engagement point;
a magnet structure attached to said base plate and formed of a permeable material, said magnet structure including top and bottom plates and first and second spacers for separating said top and bottom plates;
magnetic means, supported by said magnet structure, for providing a magnetic field;
a coil, supported by said second end of said actuator arm and lying in a plane substantially parallel to said disk, for passing a current in the magnetic field;
a latch body, pivotably supported on said base plate, having a finger which extends through said top plate of said magnet structure for selective engagement with said latch engagement point of said actuator arm;
a header provided in said base plate;
a reverse flex circuit engaged with said header and said actuator arm and making an arc which opens away from said disk for electrically interconnecting said header with said coil and said interactive means;
latch activation means located between said header and said magnet structure for selectively engaging said finger of said latch body with said latch engagement point;
control means, mounted on the opposite side of said base plate from said disk and electrically connected to said header, for controlling said latch activation means, supplying current to said coil, and controlling said interactive means; and
a cover, sealably attached to said base plate, for maintaining said disk, actuator arm, coil, and magnet structure in a controlled environment.

11. A low height disk drive according to claim 10, wherein said control means includes a printed circuit board having a top and a bottom, circuit components mounted on the top of said circuit board, and a rear entry connector mounted on top of said circuit board for engaging said header so that the bottom of said circuit board faces said base plate.

12. A low height disk drive according to claim 10, further comprising a crash sleeve provided on said second spacer of said magnet structure to provide an outside diameter crash stop, wherein said finger of said latch body provides an inside diameter crash stop;

13. A low height disk drive according to claim 10, further comprising:
bracket means pivotably supported on said base plate and engaged with said flex circuit for supporting and positioning said latch activation means; and
a flex circuit stiffener attached to the portion of said reverse flex circuit engaged with said header and said bracket means.

14. A low height disk drive according to claim 13, wherein:
said second end of said actuator arm includes a curved shoulder portion, and
said reverse flex circuit includes a first portion for electrically interconnecting said header and said interactive means and a second portion for providing current to said coil, a section of said first portion of said reverse flex circuit wraps around said shoulder portion of said actuator arm.

15. A disk drive responsive to a host computer and having an overall height of one inch (1") or less, comprising: a base plate, said base plate having top and bottom surfaces, first and second ends, first and second sides, and first and second rails attached to respective ones of said first and second sides of the base plate, each said rail having a support surface lying in a first plane, said top and bottom surfaces of said base plate lying in a second plane which makes an angle greater than zero degrees with said first plane;
storage means rotatably supported on the top of said base plate, said storage means lying in a plane substantially parallel to said first plane;
interactive means for reading information from and writing information on said storage means;
actuator means supported at the first end of said top of said base plate and responsive to control signals for selectively positioning said interactive means with respect to said storage means at points in a plane substantially parallel to said first plane;
control means supported on said bottom of said base plate for generating control signals, and for providing information signals to and receiving information signals from said interactive means;
connection means supported at the second end of the bottom of said base plate for interconnecting said control means with the host computer; and
a cover sealably attached to said top of said base plate to provide a controlled environment between said cover and said base plate.

16. A disk drive according to claim 15, wherein said cover has a top surface which lies in a plane substantially parallel to the first plane.

17. A disk drive according to claim 15, further comprising:
a header for transferring the control signals from the control means to the controlled environment between said cover and said base plate; and
a reverse flex circuit for electrically interconnecting said header, said actuator means, and said interactive means, said reverse flex circuit being attached to said header and said actuator means and curving therebetween so that the outside of the curve faces said disk.

18. A disk drive according to claim 17, further comprising:
an electromagnetic latch mechanism, comprising:
a latch coil, and a latch arm, pivotably supported on said base plate, for selectively engaging said actuator means; and a bracket for supporting a portion of said reverse flex circuit and said latch coil; and a stiffener attached to the portion of said reverse flex circuit supported by said bracket and the portion of said reverse flex circuit which is electrically connected to said header.

19. A low height disk drive responsive to a host computer, comprising:

a base plate having top and bottom surfaces;

a rotatable disk supported on the top of said base plate;

control means, provided on the bottom of said base plate for generating control signals;

means, responsive to control signals, for interacting with said disk, comprising:

head means for reading and recording information, an actuator arm pivotably supported on said base plate for supporting said head means, and voice coil means for pivoting said actuator arm to selectively position said head means with respect to said disk;

header means for passing the control signals through said base plate;

a reverse flex circuit for electrically interconnecting said header means and said means for interacting with said disk, said reverse flex circuit forming an arc between said header means and said means for interacting with said disk so that the arc opens away from said disk;

latch means, responsive to control signals, for selectively engaging said actuator arm, comprising:

a latch arm pivotably supported on said base plate and selectively engageable with said actuator arm, and electromagnetic means positioned between said header and said voice coil means for disengaging said latch arm from said actuator arm; and cover means sealably attached to the top of said base plate.

20. A disk drive according to claim 19, wherein:

said base plate has first and second ends;

said control means includes connection means provided on said control means at the first end of said base plate for electrically interconnecting said control means and the host computer;

said header, voice coil means, and electromagnetic means are provided at the second end of said base plate; and said base plate is sloped to provide space for said connection means below said base plate and to provide space for said header, voice coil means, and electromagnetic means above said base plate and inside said cover.

21. A disk drive according to claim 20, wherein:

said disk lies in a first plane; and said base plate lies in a second plane which makes an angle greater than zero degrees with said first plane.

22. A disk drive according to claim 21, wherein the height of the disk drive is less than or equal to one inch.

23. A disk drive according to claim 21, wherein:

said actuator arm pivots in a plane substantially parallel to said first plane; and said voice coil means comprises a coil provided on said actuator arm and lying in a plane substantially parallel to said first plane and magnetic means.

24. A disk drive according to claim 21, wherein said base plate is formed of non-permeable material; and said voice coil means comprises:

first and second permeable plates lying in said first plane;

permeable spacers for separating and attaching said first and second permeable plates;

magnetic means supported by said first permeable plate for creating a magnetic field; and a coil provided on said actuator arm for passing an electric current in said magnetic field.

25. A disk drive according to claim 24, wherein:

said magnetic means comprises first and second magnets each having a north and south pole, said first and second magnetic means being attached to said first permeable plate so that opposite poles of said first and second magnetic means are in contact with said first permeable plate and so that said first and second magnetic means are spaced apart; and said coil comprises a first portion for passing an electric current in the region between said first magnetic means and said second permeable plate and a second portion for passing a current in the region between second magnetic means and said second permeable plate.

26. A disk drive according to claim 25, wherein:

said first and second permeable plates, first and second magnetic means, and said permeable spacers provide three magnetic loops;

said first magnetic loop passing between said first magnet means and said second permeable plate, through said second permeable plate, a permeable spacer, and said first permeable plate;

said second magnetic loop passing between said first magnet means and said second permeable plate, through said second permeable plate, between said second permeable plate and said second magnet means and through said first permeable plate; and said third magnetic loop passing between said second magnet means and said second permeable plate, through said second permeable plate, a permeable spacer, and said first permeable plate.

* * * * *

UNITED STATES PATENT AND TRADEMARK OFFICE
CERTIFICATE OF CORRECTION

PATENT NO.   :   4,965,684
DATED        :   October 23, 1990
INVENTOR(S)  :   Frederick M. Stefansky It is certified that error appears in the above-identified patent and that said Letters Patent is hereby corrected as shown below:

Column 1, after "LOW HEIGHT DISK DRIVE" and before "CROSS-REFERENCE TO RELATED APPLICATIONS", delete "This is a continuation of application Ser. No. 7/129,879, filed Dec. 4, 1987, now abandoned, which is a continuation of application Ser. No. 6/895,381 filed Aug. 11, 1986, now abandoned."

Column 4, line 23, after "assemble" and before "in" change "loW" to --low--.

Column 4, line 45, after "isometric" and before "of" change "vieW" to --view--.

Signed and Sealed this

Fourteenth Day of July, 1992

Attest:

DOUGLAS B. COMER

*Attesting Officer*        Acting Commissioner of Patents and Trademarks